United States Patent [19]

Neilson et al.

[11] Patent Number: 4,531,308

[45] Date of Patent: Jul. 30, 1985

[54] APPARATUS FOR CONDITIONING HYGROSCOPIC PLASTIC MATERIAL

[75] Inventors: James R. Neilson, Toronto; Robert R. Bishop, Agincourt, both of Canada

[73] Assignee: Cactus Machinery Inc., Markham, Canada

[21] Appl. No.: 490,239

[22] Filed: Apr. 29, 1983

[51] Int. Cl.³ .............................................. F26B 17/12
[52] U.S. Cl. ....................................... 34/168; 34/174; 34/176; 425/376 R; 425/542
[58] Field of Search .......................... 34/168, 174, 176; 366/76; 425/542, 547, 548, 376 R, 378 R, 203, 208

[56] References Cited

U.S. PATENT DOCUMENTS

| | | | |
|---|---|---|---|
| 2,180,968 | 11/1939 | Schorn et al. | 34/168 |
| 3,175,302 | 3/1965 | Retali et al. | 34/174 |
| 3,335,461 | 8/1967 | Schwartz | 425/547 |
| 3,875,683 | 4/1975 | Waters | 34/74 |
| 4,043,050 | 8/1977 | Hancock | 34/168 |
| 4,168,942 | 9/1979 | Firth | 425/378 R |
| 4,258,476 | 3/1981 | Caughey | 34/174 |
| 4,353,851 | 10/1982 | Godfrey et al. | 366/76 |
| 4,446,094 | 5/1984 | Rossiter | 425/203 |

FOREIGN PATENT DOCUMENTS 151722  9/1955  Sweden ................................ 34/168

OTHER PUBLICATIONS

"Dehydron", Brochure, J.R.F. Systems Mfg. Ltd., 1983.

Primary Examiner—Edward G. Favors
Assistant Examiner—Steven E. Warner
Attorney, Agent, or Firm—Sim & McBurney

[57] ABSTRACT

Apparatus for conditioning granules of plastic resin comprises a barrel having a hopper feed at its upper portion and a resin discharge at its lower portion to provide for gravitational flow of the granular resin through the barrel. The barrel periphery is perforated to permit passage of heated gases into the barrel and over the granular resin. A channel is defined centrally of the barrel and extends therealong to collect gases flowing over the resins and discharge such gases externally of the barrel.

13 Claims, 6 Drawing Figures

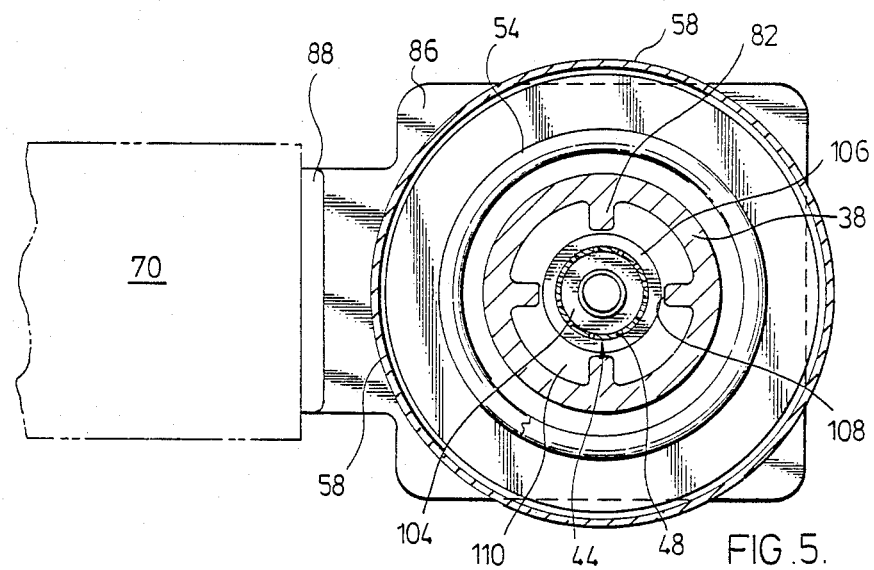
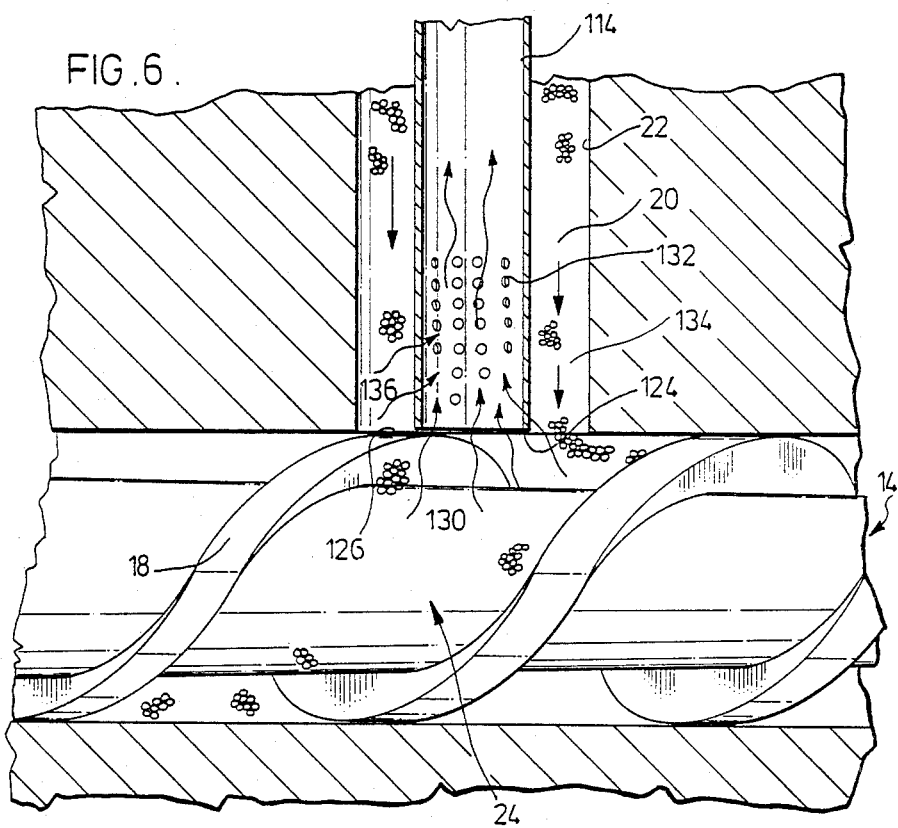

APPARATUS FOR CONDITIONING HYGROSCOPIC PLASTIC MATERIAL

FIELD OF THE INVENTION

This invention relates to apparatus and method for conditioning granular resins for use in plastics molding or extrusion machines.

BACKGROUND OF THE INVENTION

In the art of injection molding and extruding plastics, it is often necessary to remove moisture from the plastic resins prior to use in a plastics forming machine. This is particularly important in situations where any moisture present in the resin can result in flaws in the formed product. Many resins used in plastic forming techniques are hygroscopic which can require many hours of drying time before use. Examples of such hygroscopic resins are nylon, acrylics, ABS (acrylonitrile-butidiene-styrene), polycarbonates and thermoplastic polyesters. An example of a device which has been developed to reduce the moisture content of such granular resins is disclosed in U.S. Pat. No. 3,875,683. The granular resin passes downwardly through the bin and dry conditioning air is forced upwardly through the resin by way of plenums located at the base and/or centrally of the bin. By forcing the dry air into the resin from the central region of the bin, a complex arrangement of plenums, collecting channels and desiccant beds for the moisture laden gases is required thereby adding to the size of the unit and complexity in structure.

SUMMARY OF THE INVENTION

Apparatus, according to an aspect of this invention for removing moisture from granules of plastic resin, comprises a barrel with peripheral wall which is vertically oriented in use. The barrel has means for receiving granular resin into the upper region thereof whereby the resin moves downwardly of the barrel under the influence of gravity. Means is provided for discharging the granular resin from the lowr region of the barrel. A plurality of longitudinally extending spaced apart means provides fin-like projections internally of and integrally with the barrel wall. A plurality of spaced-apart apertures are provided in the barrel wall. Means extends lengthwise of the barrel to define a channel for permitting a flow of gases thereinto and therealong. The fin-like means locates the channel means centrally of the barrel. The channel means is a perforated tube of an external dimension slightly less than that of the internal dimension defined by the extremities of the internally projecting fin-like means to permit insertion of and to locate thereby the tube centrally of the barrel. The fin-like means are a plurality of inwardly projecting fins, each of which extends substantially the length of the interior of the barrel wall. The fins are sufficiently spaced apart to permit downward passage of the granular resin between the fins. Means is provided for effecting a flow of gases for drying granular resin, through the apertures in the barrel wall over the granules of resin and into and along the channel means. The channel means is adapted to exhaust directly such gases away from the granular resin and outwardly of the channel means.

According to a preferred aspect of the invention, the gases which flow over the resin are preheated by way of a helical heating coil which surrounds and is spaced-apart from the barrel periphery. A temperature controller may be used to determine the temperature of the granular resin and control the temperature of the heater coil so as to heat the granular resin by the heated gases to within a desired temperature range.

BRIEF DESCRIPTION OF THE DRAWINGS

Preferred embodiments of the invention are shown in the drawings wherein:

FIG. 5 is a section along lines 5—5 of FIG. 1, and;

FIG. 6 is an enlarged section of the resin receiving area for the plasticization screw of FIG. 1.

DETAILED DESCRIPTION OF THE PREFERRED EMBODIMENTS

Figure 1:
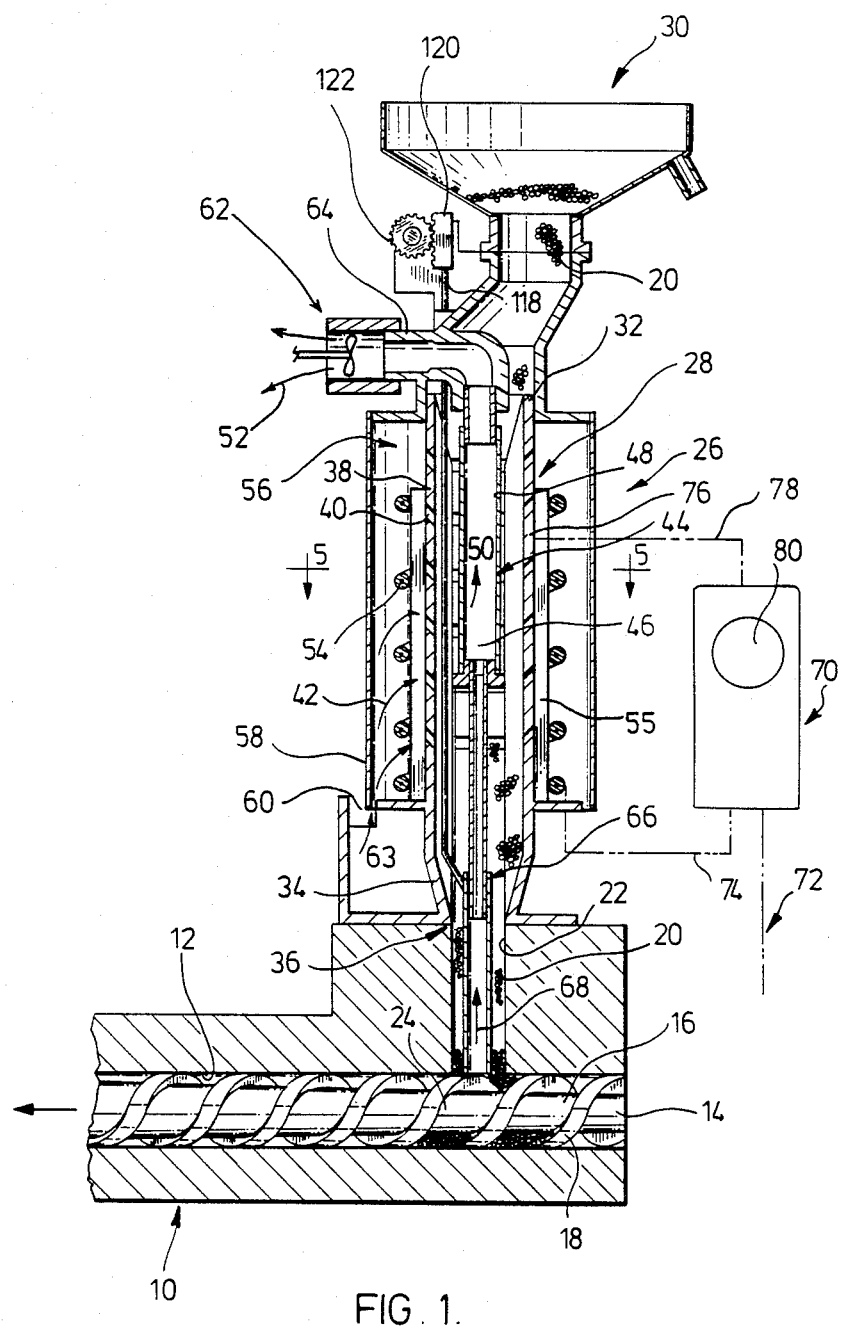
FIG. 1 is a section through the apparatus for removing moisture from and preconditioning granular plastic resin charged into the plasticization screw area of a plastics forming machine.

The apparatus, according to this invention, may be used in various situations for removing moisture from granular plastic resin, particularly, hygroscopic types of resins. Such apparatus is applicable for use on plastic injection molding machines and plastic extrusion machines which commonly have a standard plasticization screw feed with a heated barrel. With hygroscopic resins, moisture may be held within the granules and cannot be readily removed by surface air passing over them. According to this invention, the water vapor released by heating moisture within the resin during plasticization of the plastic is removed from the screw area.

An apparatus in which the invention is embodied demonstrates its use with the plasticization screw of a plastics forming device such as an injection molding or extrusion machine. The screw device 10 of the plastics forming machine comprises a tube 12 which may be heated by cartridge heaters or the like (not shown) in which an auger or screw device 14 is provided. The screw has a tapered core 16 with a helical screw ridge 18. The conditioned granular resin 20 travels down the receiving inlet 22 into the screw region 24. Area 24 is heated to a temperature such that the warmed resin 20, upon entering the region 24, becomes plasticized as it moves along the tube 12 so as to become softened for extrusion or injection molding purposes.

The apparatus 26 for conditioning the resin comprises a barrel or bin 28 having a hopper feed 30 at its upper portion 32. At the lower portion 34 is the dicharge port or opening 36. The resin is placed in the hopper feed 30 and by gravitational flow the resin flows downwardly through the barrel 28, through the discharge port 36 and into the inlet 22.

Figure 2:
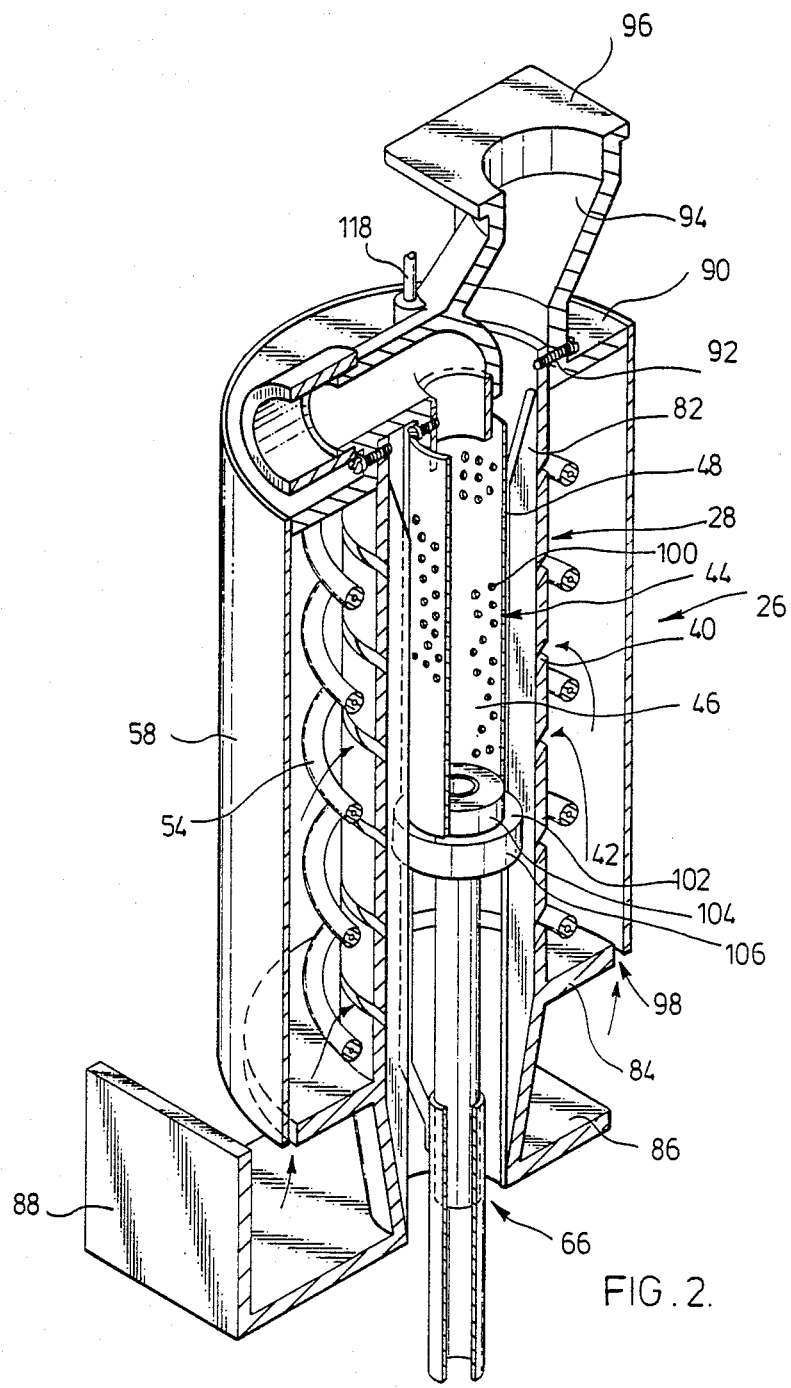
FIG. 2 is a perspective view of the apparatus of FIG. 1 with a portion removed to show details thereof.

The barrel peripheral wall 38 is perforated by having a plurality of apertures 40 formed therein. The apertures, according to a preferred embodiment of this invention, are circumferentially extending slots. It is appreciated that other forms of apertures may be provided in the wall. Conditioning gases, as represented by arrows 42, are caused to flow through the apertures 40 of the barrel wall and into the barrel so as to flow over and about the granular resin 20. Internally of the barrel 28 is a device 44 which defines a channel 46. The channel 46 extends lengthwise of the barrel 28 and centrally thereof. The device 44, according to this preferred embodiment, comprises a perforated tube 48, the details of which are shown in FIG. 2. Thus the gases, as they flow over the granular resin, travel through the perforated tube 48 and upwardly of the channel 46 in the direction of arrow 50 to be exhausted in the direction of arrows 52 away from and externally of the barrel 28.

Several apparent techniques may be employed to cause the flow of air 42 through the barrel wall and upwardly through channel 46. For example, simple heating of the air contained within chamber 56 defined by outer sleeve 58 may be done to cause the air to flow through the apertures 40 and upwardly through the channel 50. The air may be heated by any suitable heating device such as heater bands about the barrel periphery, heater cartridges within the barrel wall and/or fins or preferably a heater coil 54. The coil 54 is preformed into a diameter greater than the periphery of barrel wall 38. Insulating spacers 55 of porcelain or the like may be used to space the heating coil from the barrel wall to ensure that the coil does not contact the wall. The use of the spacers prevents over heating of the wall in certain areas to avoid hot spots on the barrel wall which could melt the resin and foul the barrel interior. However if for some reason the heating coil momentarily increases to an undesirably high temperature, the spacing from the barrel wall acts as a buffer so that the extraordinarily high temperature of the heating coil does not directly and immediately affect the temperature of the resin. This arrangement is important to accommodate transients in the temperature of the coil which may be caused by power surges and momentary inoperativeness of the controller for the heating coil.

Other approaches to improving the rate of gas flow over the resin include providing devices which will force the air over the coils 54 and upwardly of the channel 46. This may be accomplished by locating a fan which would force air in the direction of arrow 63 into the entrance region 60 of the chamber 56. Alternatively, a fan 62 may be mounted at the exhaust port 64 of the channel ducting 46 to assist the flow of heated gases upwardly within channel 46. Fan 62 is power driven to withdraw the gases from the ducting 46.

In addition to any surface moisture which has to be removed from the granular resin by air currents 42, water vapors are also generated in region 24 where the resin becomes molten. With hygroscopic resins, any moisture contained internally thereof is heated to form water vapor as the plastic melts. By way of an arrangement 66, an extension is provided for the channel 46. The tube arrangement 66 extends out of the discharge portion 36 of the bin into the inlet 22, to adjacent the screw device 14 in the region 24. Water vapor, as generated in and migrating to this region, can pass upwardly of the tube extension 66 in the direction of arrow 68. The upward flow of air in channel 46 as indicated by arrow 50 draws such water vapor in the direction of arrow 68.

The temperature to which the resin 20 is heated in the bin is important to ensure smooth flow of the resin into screw region 24. The heated air, as it passes over the heater coils 54, must be monitored so as to not overheat the resin yet provide sufficient heat to remove any surface moisture from the granular resin and to raise the temperature uniformly throughout the resin. This prewarming of the resin ensures that it melts quickly in the plasticizing screw, namely, in region 24. Thus any water vapor generated is in the proximity of the tube extension 66 and not further down the screw where it would be difficult to remove any generated water vapor.

A temperature controller 70 is provided and powered by line 72 to control the temperature of the resin. The temperature controller 70 controls the amount of power delivered through line 74 to the heating coil 54. A temperature sensor at 76 is provided which electrically communicates with the controller 70 via line 78. By way of experimentation, the wall temperature of the bin 28 is measured to assess the corresponding temperature of the resin. Thus by programming the controller 70 and properly setting dial 80 to the correct temperature, the voltage on coil 54 is controlled by the controller 70 in accordance with the temperature sensed at 76. This ensures that the temperature of the resin is maintained at the desired level as it is discharged from the conditioning apparatus 26.

FIG. 2 shows that the barrel in apparatus 26 is cast from a metal. Various metals may be employed, such as steel or aluminum alloys. Aluminum alloys are preferred because of their higher heat conductivity. Internally projecting of the bin or barrel are integral fins 82 which are shown in more detail in FIG. 3. A function of the fins is to locate the tubular arrangement 44 centrally of the barrel 28. Another function is that the integral fins 82, as they extend the length of the barrel, support the structure of the barrel with apertures in the wall. When the slots 40 are cut in the barrel sidewall around its entire periphery, the fins which are integral with the wall serve to retain the structural integrity of the barrel. As shown in FIGS. 1 and 2, the slots 40 are sloped downwardly to prevent granular resin from falling out of the bin. The downwardly sloped slots also direct warming air downwardly into the resin to diffuse the air somewhat before progressing upwardly and outwardly through the channel 46.

The barrel 28 includes an annular flange 84 at its lower portion and an integrally formed base plate 86 for purposes of mounting the conditioning apparatus 26 to the screw feed arrangement. Upstanding plate 88 is provided to which the controller 70, as schematically shown in FIG. 1, is secured.

At the upper portion of the barrel 28 is a collar arrangement 90 which is secured to the barrel wall by way of bolts 92. The collar 90 includes an elbow 94 with a flange portion 96 to which the hopper arrangement 30 is secured. To the periphery of collar 90 is secured the outer shell 58 for the apparatus which houses the barrel and heating coil 54. The housing 58 extends downwardly and is marginally spaced from the periphery of flange 84 to provide a space upwardly through which conditioning air may flow in the direction of arrows 98.

The tubular arrangement 44 for defining the central channel consists of a perforated tube 48 having perforations 100. The tube is mounted on ring 102 having an inner portion 104 over which the tube 48 is placed and is in contact therewith and an outer portion 106 which is larger in diameter than the tube 48. The diameter of ring outer portion 106 is slightly less than the diameter of the opening defined by the fins 82. As is apparent from FIG. 5, the outer ring 106 is loosely received by the fin extremities 108. The spacing between the fins 82, according to the preferred embodiment, is equal to provide four channels 110. The spacing between the fins 82 is such that the channels 110 are of sufficient size to permit ready downward gravitational flow of the granular resin. By way of the fins projecting into the flow of the resin, the warming of the resin is more efficient. The fins and bin wall may be cast aluminum alloy which has a high heat conductivity to warm thereby the granular resin more effectively and uniformly.

Figure 3:
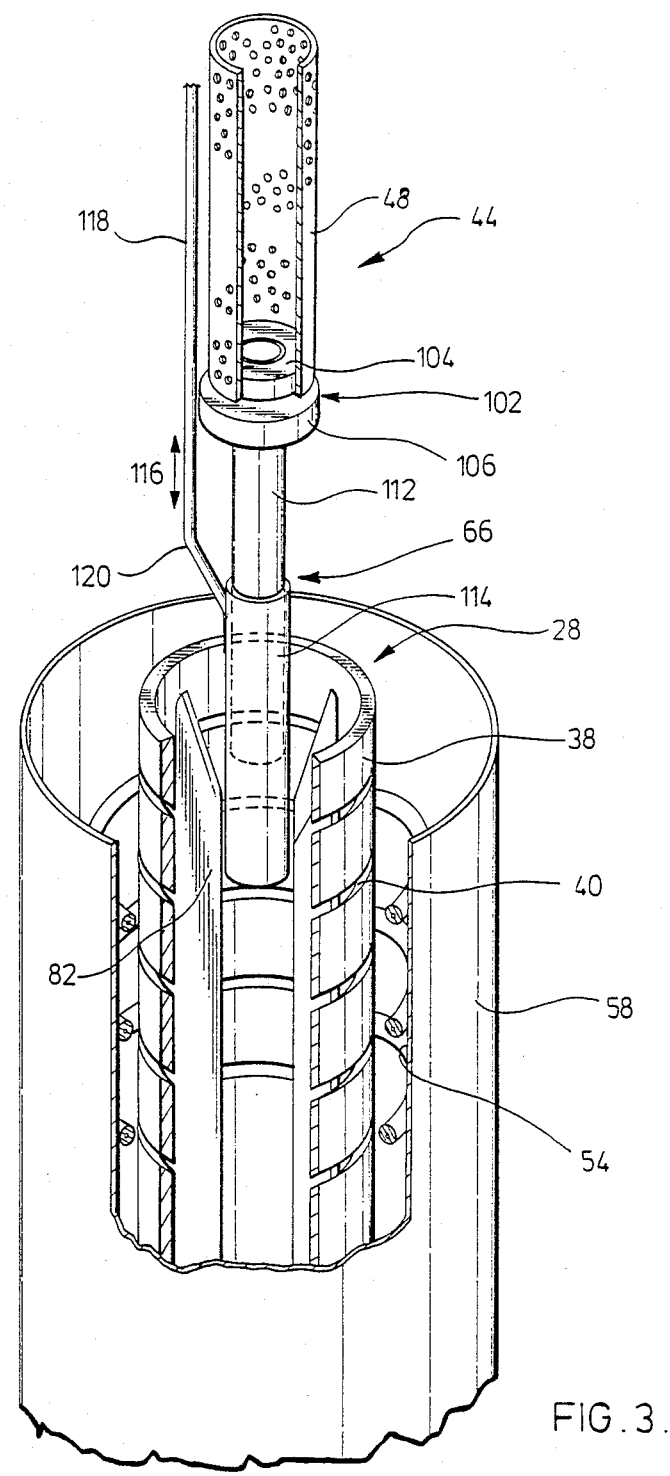
FIG. 3 is a perspective view of the resin receiving bin with a section removed.

As shown in FIG. 3, the tube arrangement extension 66 comprises a first tube 112 and a second tube 114. Tube 112 is secured in the ring 102 to extend downwardly therefrom. Tube 114 has an internal diameter which approximates the external diameter of tube 112 so as to slidably move thereover in the direction of arrow 116. Secured to the tube 114 is a rod 118 which is angled at 120 to extend upwardly through a corresponding channel 110 between the fins 82. The rod 118 extends upwardly through the collar arrangement 90 to extend outwardly therefrom, as shown in FIG. 2. Rod 118 is secured to a rack 120 which meshes with a pinion 122. A crank (not shown) with appropriate brake may be used to adjust the rack and pinion 120, 122 to move the tube 114 up and down relative to the plasticization screw 14. This arrangement provides the needed adjustability in the axial position of the tube 114, because with the many different forms of feed and plasticization screws for plastic forming machines, different height requirements are needed. With the rack and pinion arrangement, the apparatus 26 may be readily adjusted to provide the proper positioning for the tube 114 relative to the screw.

Turning to FIG. 6, the positioning of tube 114 is shown in more detail. The tube end 124 is slightly above the uppermost elevation 126 for the spiral ridge 18 of the screw 14. The resin 20 passes downwardly of the inlet 22 in the direction of arrows 128 to be moved away from region 24 by rotation of the screw 14 in a manner well understood by those skilled in the art of plastics forming equipment. Water vapors, which are generated in region 24 by the resin becoming plasticized, move upwardly into the tube 114 in the direction of arrows 130. By way of the device 62 or its equivalent, creating an upward flow of gases in channel 46, the vapors are drawn upwardly of the tube 114 for discharge externally of the bin.

According to a preferred aspect of the invention, the lower portion of the tube 114 may have perforations 132. The water vapors generated in region 24 principally diffuse toward the lower end 124 of the tube. However, some of the vapors may diffuse upwardly through the annular region 134. Thus perforations 132 allow such vapors to be drawn into the tube in the directions of arrows 136. With this arrangement, aside from the removal of the surface moisture on the granular resin, any moisture or water vapor generated in the lower region at the area of the screw feed where plasticization takes place, is removed from the molten plastic before injection to minimize or alleviate any imperfections in the molded product.

Figure 4:
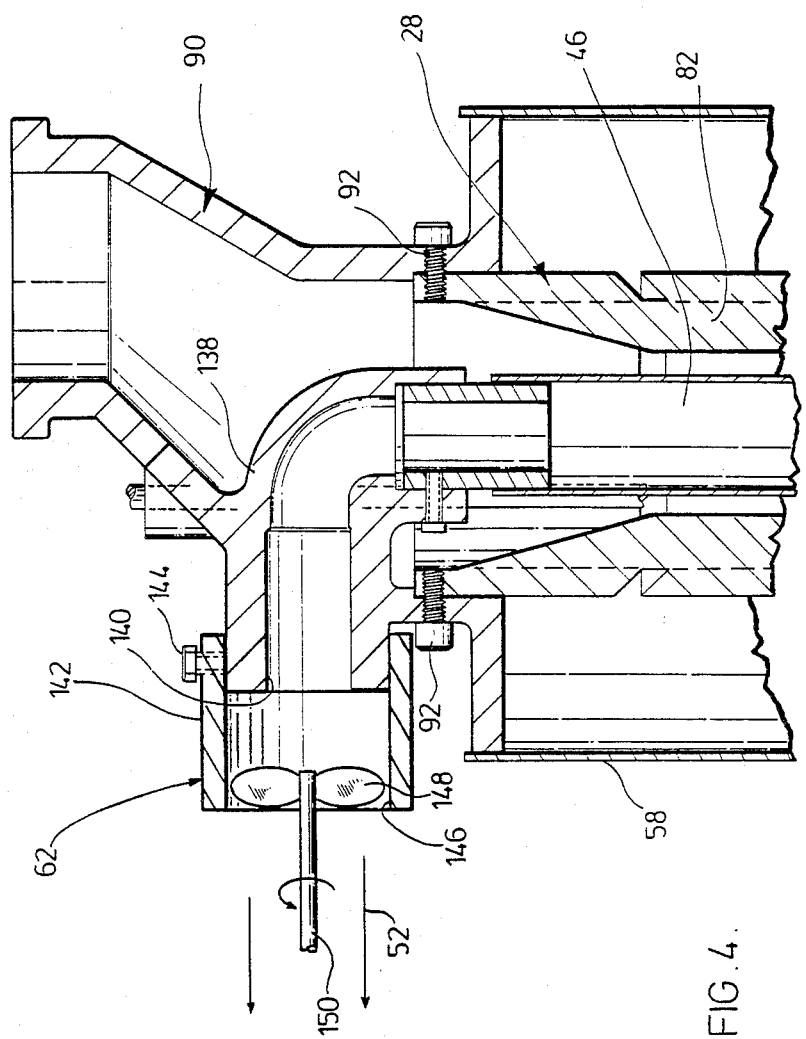
FIG. 4 is a section through the upper portion of the apparatus of FIG. 1.

As previously explained various techniques may be employed to generate or assist in forming a relative low air pressure in the central channel of the bin to withdraw gases and water vapors from the base of the channel in the feed screw area. An alternative to heating the air in enclosure 56 to provide an upward flow in channel 46, is the use of a fan device 62 as shown in FIG. 4. The channel 46, by way of an elbow 138 in the collar arrangement 90, directs the gases externally of the bin 28 to define an outlet port 140. The fan device 62 is mounted on the outlet port 140 by way of casting 142 secured to the port 140 by bolt 144. Casting 142 provides cowling 146 for the fan blades 148 which are rotated on power driven shaft 150. The fan creates a low pressure at the nozzle opening so as to withdraw gases from the channel 46 in the direction of arrow 52.

In the event that it is desired to clean the interior of the bin 28, it is apparent that bolts 92, as shown in FIG. 4, may be removed to permit removal of the collar arrangement 90 and accompanying venturi device 62. As a result the tube arrangement 44 with extensions 66 may be removed upwardly and outwardly of the bin 28 to allow cleaning of the interior of the bin and cleaning of the tube arrangement 44. This is particularly necessary when colored resins are used and minor amounts of colored material may remain in the bin which must be removed before introduction of a different colored resin for use in the plastics forming machine.

The provision of an integrally cast barrel with inwardly projecting fins provides several advantages as already described in detail and summarized as follows. Where the slots in the barrel each extend around the entire periphery of the barrel wall and extend all the way therethrough, the fins serve to retain the structure of the barrel wall intact and at the same time the fins, as they project into the resin flowing down through the barrel, provide an effective efficient means for uniformly heating the resin. In addition, the fins serve to in turn centrally locate the tubular central channel in the bin for removal of gases which have flowed over the granular resin. The fins may be of a size to add additional rigidity to the structure of the barrel wall with apertures to withstand heavy loads on the barrel. For example, hoppers and the like which are mounted to the upper portion of the barrel may be of considerable weight which is entirely supported by the integrally cast barrel wall and fin supports.

Although various preferred embodiments of the invention have been described herein in detail, it will be understood by those skilled in the art that variations may be made thereto without departing from the spirit of the invention or the scope of the appended claims.

The embodiments of the invention in which an exclusive property or privilege is claimed are defined as follows:

1. Apparatus for removing moisture from granules of plastic resin comprising a barrel with a peripheral wall which is vertically oriented in use and having means for receiving granular resin into an upper region thereof whereby such granular resin moves downwardly of said barrel under the influence of gravity, discharge means for discharging granular resin from a lower region of said barrel, a plurality of longitudinally extending spaced-apart means providing fin-like projections internally of and integrally with said barrel wall a plurality of spaced apart apertures in the barrel wall, channel means insertable lengthwise into said barrel to define a channel for permitting a flow of gases thereinto and therealong, said channel means being a perforated tube of an external dimension slightly less than the internal dimension defined by the extremities of the internally projecting fin-like means to permit insertion thereof and to locate thereby said tube centrally of said barrel, said fin-like means being a plurality of inwardly projecting fins, each of which extends substantially the length of the interior of the barrel wall, said fins being sufficiently spaced apart to permit downward passage of such granular resin between said fins, means for effecting a flow of gases for drying granular resin through the apertures in said barrel wall, over granules of resin in said barrel and into and along said channel means, said channel means being adapted to exhaust directly such gases away from such granular resin and outwardly of said channel means.

2. Apparatus of claim 1, wherein means couples said tube to the exterior of said barrel, an exhaust fan connected to said coupling means exterior of said barrel to withdraw gases from said channel means.

3. Apparatus of claim 1 wherein said apertures are sloped downwardly as they extend through the barrel wall.

4. Apparatus of claim 1 wherein a helical heating coil surrounds and is spaced apart from said barrel wall to heat gases prior to flowing through the apertures in said barrel wall and a housing surrounding said heating coil to house said barrel and coil, said housing having an opening to permit gases in the form of air to be drawn into said housing.

5. Apparatus of claim 1 wherein extension means forms an extension of said channel means to extend beyond said discharge means and adapted to extend into an inlet for receiving conditioned granular resin of a plastics molding or extrusion machine when said apparatus is in use, said extension means forming a secondary channel into which pass water vapour given off by plasticizing such granular resin in a plasticizing screw, such flow of gases upwardly of said channel drawing such water vapor into said extension means and upwardly into said channel means for exhausting from said barrel.

6. Apparatus of claim 5, wherein said channel means and its extension means constitutes a multiple tube arrangement including an upper tube and a lower tube which is mounted on said upper tube in a manner to provide axial adjustment of said lower tube reltive to said upper tube, said lower tube being perforated about its lower portion.

7. Apparatus of claim 6, wherein means external of said barrel adjusts the axial position of said lower tube and releasably locks said lower tube in any desired position.

8. Apparatus of claim 1, wherein said barrel is of cast aluminum alloy.

9. Apparatus of claim 1, wherein each of said apertures extends circumferentially around the barrel, said fins retaining the structural integrity of the barrel wall.

10. Apparatus of claim 1, wherein said barrel and said tube are cylindrical in shape whereby said tube is of an external diameter slightly less than the internal diameter defined by the extremity of the fins.

11. Apparatus of claim 1, wherein heating bands surround and are in contact with said barrel peripheral wall, said flow of gases being heated by flowing over said heating bands prior to passing through said apertures, a housing surrounding said heating bands to house said heating bands and barrel, said housing having an opening to permit gases in the form of air to be drawn into said housing.

12. Apparatus of claim 4 or 11, wherein insulation is provided on the interior of said housing.

13. Apparatus of claim 4 or 11, wherein a temperature controller is adapted to determine the temperature of such granular resin, said temperature controller controlling the temperature of said heater coil to heat such granular resin by the heated gases to within a desired temperature range.

* * * * *